United States Patent
Sugimoto et al.

(10) Patent No.: US 12,140,670 B2
(45) Date of Patent: Nov. 12, 2024

(54) RANGING DEVICE

(71) Applicant: KOITO MANUFACTURING CO., LTD., Tokyo (JP)

(72) Inventors: Shintaro Sugimoto, Shizuoka (JP); Masato Gomi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 963 days.

(21) Appl. No.: 17/263,252

(22) PCT Filed: Jul. 19, 2019

(86) PCT No.: PCT/JP2019/028428
§ 371 (c)(1),
(2) Date: Jan. 26, 2021

(87) PCT Pub. No.: WO2020/022206
PCT Pub. Date: Jan. 30, 2020

(65) Prior Publication Data
US 2021/0190949 A1    Jun. 24, 2021

(30) Foreign Application Priority Data

Jul. 27, 2018 (JP) .................. 2018-141097

(51) Int. Cl.
*G01S 17/931* (2020.01)
*G01S 17/10* (2020.01)

(52) U.S. Cl.
CPC ............ *G01S 17/10* (2013.01); *G01S 17/931* (2020.01)

(58) Field of Classification Search
CPC ..................................................... G01S 17/931
See application file for complete search history.

(56) References Cited

U.S. PATENT DOCUMENTS

| | | | |
|---|---|---|---|
| 6,229,598 B1 | 5/2001 | Yoshida | |
| 2016/0282468 A1 | 9/2016 | Gruver et al. | |

(Continued)

FOREIGN PATENT DOCUMENTS

| | | |
|---|---|---|
| JP | 10-153417 A | 6/1998 |
| JP | 10-227857 A | 8/1998 |

(Continued)

OTHER PUBLICATIONS

International Search Report dated Sep. 17, 2019 issued by the International Searching Authority in counterpart International Application No. PCT/JP2019/028428 (PCT/ISA/210).

(Continued)

*Primary Examiner* — Yuqing Xiao
*Assistant Examiner* — Clara G Chilton
(74) *Attorney, Agent, or Firm* — Sughrue Mion, PLLC (57) ABSTRACT

A translucent cover forms a part of an outer surface of the vehicle and covers a light emitting element and a light receiving element. A processor calculates a distance to an object that generated reflected light based on a time period from time when detecting light is emitted from the light emitting element to time when the reflected light is incident on the light receiving element, at least after it is elapsed a time period from the time when the detecting light is emitted to time when reflected light generated by an inner surface of the translucent cover is incident on the light receiving element.

5 Claims, 8 Drawing Sheets

(56) References Cited

U.S. PATENT DOCUMENTS

| | | |
|---|---|---|
| 2017/0176597 A1 | 6/2017 | Gruver et al. |
| 2017/0219713 A1 | 8/2017 | Gruver et al. |
| 2018/0011196 A1 | 1/2018 | Pennecot et al. |
| 2018/0017680 A1 | 1/2018 | Pennecot et al. |

FOREIGN PATENT DOCUMENTS

| | | | |
|---|---|---|---|
| JP | 2006-38686 A | | 2/2006 |
| JP | 2006-53076 A | | 2/2006 |
| JP | 3755216 B2 | * | 3/2006 |
| JP | 2012237580 A | * | 12/2012 |
| JP | 2017-3785 A | | 1/2017 |
| JP | 2018-49014 A | | 3/2018 |

OTHER PUBLICATIONS

International Written Opinion dated Sep. 17, 2019 issued by the International Searching Authority in counterpart International Application No. PCT/JP2019/028428 (PCT/ISA/237).

Decision of Dismissal of Amendment issued on Nov. 29, 2023 by the Japanese Patent Office in Japanese Patent Application No. 2020-532353.

Office Action issued Jul. 25, 2023 by the Japanese Patent Office in counterpart Japanese Patent Application No. 2020-532353.

\* cited by examiner

RANGING DEVICE

CROSS-REFERENCE TO RELATED APPLICATIONS

This application is a National Stage of International Application No. PCT/JP2019/028428 filed Jul. 19, 2019, claiming priority based on Japanese Patent Application No. 2018-141097, filed Jul. 27, 2018, the contents of all of which are incorporated herein by reference in their entirety.

FIELD

The presently disclosed subject matter relates to a ranging device adapted to be mounted on a vehicle.

BACKGROUND

Patent Document 1 discloses a LiDAR (Light Detecting and Ranging) sensor unit as an example of a distance sensor adapted to be mounted on a vehicle. The LiDAR sensor unit detects a distance to an object that generated reflected light based on a time period from the time when detecting light is emitted to the time when the reflected light is received.

CITATION LIST

Patent Document

Patent Document 1: Japanese Patent Publication No. 2018-049014 A

SUMMARY

Technical Problem

It is demanded to improve the measurement accuracy of the ranging device mounted on the vehicle as described above.

Solution to Problem

In order to meet the demand described above, an illustrative aspect of the presently disclosed subject matter provides a ranging device adapted to be mounted on a vehicle, comprising:
a light emitting element configured to emit detecting light;
a light receiving element;
a translucent cover configured to form a part of an outer surface of the vehicle and covering the light emitting element and the light receiving element; and
a processor configured to calculate a distance to an object that generated reflected light based on a time period from time when the detecting light is emitted from the light emitting element to time when the reflected light is incident on the light receiving element, at least after it is elapsed a time period from the time when the detecting light is emitted to time when reflected light generated by an inner surface of the translucent cover is incident on the light receiving element.

In a case where the light emitting element and the light receiving element are covered by a translucent cover forming a part of the outer surface of the vehicle, the detecting light emitted from the light emitting element may be partially reflected by an inner surface of the translucent cover and incident on the light receiving element as internally reflected light. When a light receiving signal based on the internally reflected light is outputted from the light receiving element, the processor may recognize that an object is present at the position of the translucent cover.

According to the above configuration, the reception of the light receiving signal by the processor is started after the elapse of the time period from the time when the detecting light is emitted to the time when the internally reflected light is incident on the light receiving element, so that the distance to the object can be calculated. Therefore, it is possible to eliminate the influence of the internal reflection of the translucent cover on the calculation of the distance to the object performed by the processor. Accordingly, the measurement accuracy of the ranging device is enhanced.

The above ranging device may be configured so as to comprise a timer configured to start time measurement based on emission of the detecting light. Here, the processor is configured to calculate the distance at least after the time period from the time when the detecting light is emitted to the time when the reflected light generated by the inner surface of the translucent cover is incident on the light receiving element is measured by the timer.

According to such a configuration, since the timer starts measuring the time period based on the emission of the detecting light from the light emitting element, it is possible to more accurately measure the time period.

The above ranging device may be configured so as to comprise a timer configured to start time measurement at least after it is elapsed the time period from the time when the detecting light is emitted to the time when the reflected light generated by the inner surface of the translucent cover is incident on the light receiving element. Here, the processor is configured to calculate the distance based on the time period measured by the timer.

According to such a configuration, even if the reflected light is incident on the light receiving element before the time period from the time when the detecting light is emitted to the time when the internally reflected light is incident on the light receiving element elapses, the processor cannot calculate the distance based on the received light. This is because the time measurement used for the calculation of the distance is not started by the timer. Since the processor does not have to restrain the acceptance of the output from the light receiving element, it is possible to suppress an increase in the processing load.

The above ranging device may be configured so as to comprise a lamp unit disposed in a space defined by the translucent cover, and configured to emit visible light toward the outside of the vehicle.

The lamp unit is generally disposed at four corner portions of the vehicle. The four corner portions are also portions where there are few obstacles when detecting information in an outside area of the vehicle. By arranging the light emitting element and the light receiving element so as to share the space defined by the translucent cover with the lamp unit, it is possible to efficiently detect the information in the outside area of the vehicle. On the other hand, the light emitted from the lamp unit may be reflected by the inner surface of the translucent cover. However, as described above, it is also possible to eliminate the influence of such internal reflection on the calculation of the distance to the object performed by the processor.

The above ranging device may be configured such that the light emitting element and the light receiving element constitute a part of at least one of a LiDAR sensor unit, a TOF camera unit, and a millimeter wave radar unit.

As used herein, the term "light" means an electromagnetic wave having an arbitrary wavelength capable of detecting desired information. For example, the term "light" as used herein includes not only visible light but also ultraviolet light, infrared light, millimeter waves, and microwaves.

As used herein, the term "lamp unit" means a constituent unit of a component that can be distributed by itself as a single unit while providing a desired lighting function.

As used herein, the term "sensor unit" means a constituent unit of a component that can be distributed by itself as a single unit while providing a desired information detecting function.

DESCRIPTION OF EMBODIMENTS

Examples of embodiments will be described below in detail with reference to the accompanying drawings. In each of the drawings used in the following description, the scale is appropriately changed in order to make each member have a recognizable size.

In the accompanying drawings, an arrow F represents a forward direction of the illustrated structure. An arrow B represents a rearward direction of the illustrated structure. An arrow U represents an upward direction of the illustrated structure. An arrow D represents a downward direction of the illustrated structure. An arrow L represents a leftward direction of the illustrated structure. An arrow R represents a rightward direction of the illustrated structure. The terms "left" and "right" used in the following descriptions represent the left-right directions as viewed from the driver's seat.

Figure 1:
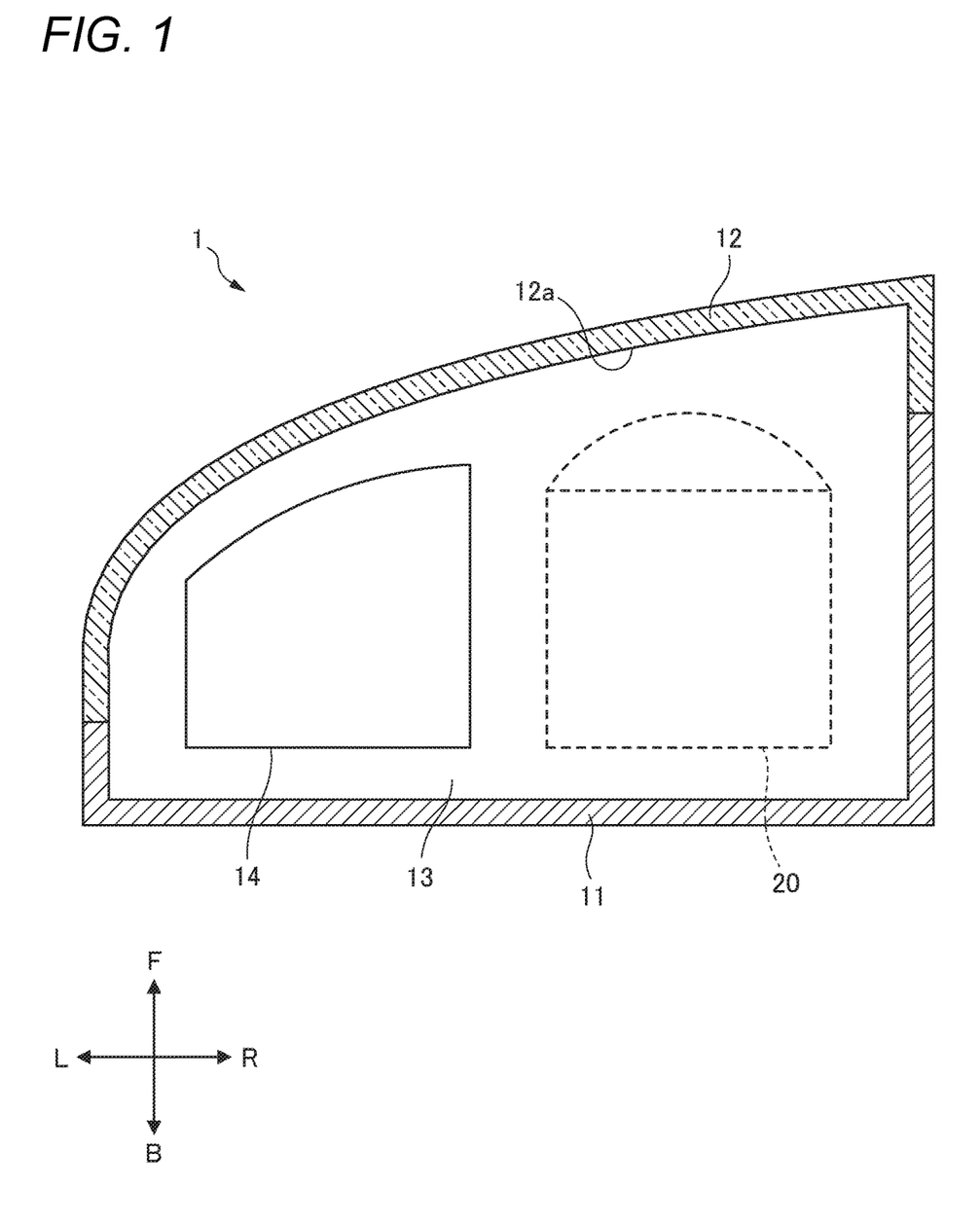
FIG. 1 illustrates a configuration of a left front ranging device according to an embodiment.

FIG. 1 illustrates a configuration of a left front ranging device 1 according to an embodiment. The left front ranging device 1 is disposed in a left front portion LF of the vehicle 100 illustrated in FIG. 2. The left front portion LF is an area located on the left of the center in a left-right direction of the vehicle 100 and ahead of the center in a front-rear direction of the vehicle 100.

As illustrated in FIG. 1, the left front ranging device 1 includes a housing 11 and a translucent cover 12. The housing 11 defines an accommodation chamber 13 together with the translucent cover 12. The translucent cover 12 forms a portion of an outer surface of the vehicle 100.

The left front ranging device 1 includes a LiDAR sensor unit 14. The LiDAR sensor unit 14 is disposed in the accommodation chamber 13.

Figure 3A:
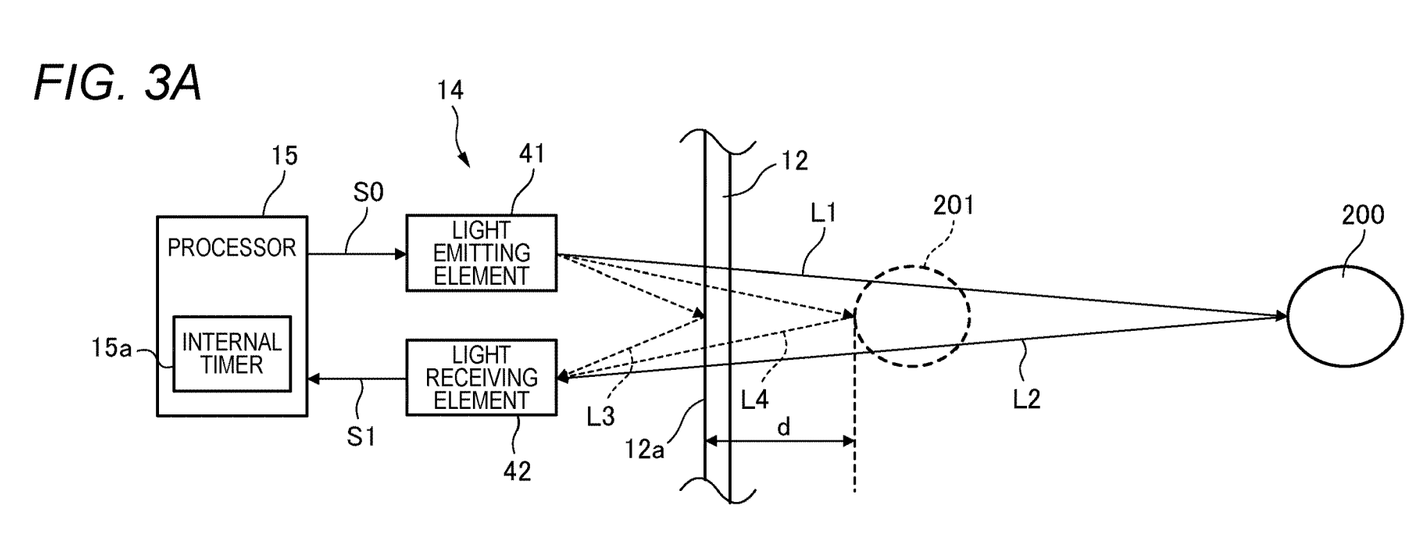
FIG. 3A illustrates a first exemplary configuration of the left front ranging device of FIG. 1.

FIG. 3A illustrates a first exemplary configuration of the left front ranging device 1. The LiDAR sensor unit 14 includes a light emitting element 41 and a light receiving element 42. The translucent cover 12 covers the light emitting element 41 and the light receiving element 42.

The light emitting element 41 is configured to emit detecting light L1 toward the outside of the vehicle 100. As the detecting light L1, for example, infrared light having a wavelength of 905 nm can be used. As the light emitting element 41, a semiconductor light emitting element such as a laser diode or a light emitting diode can be used.

The LiDAR sensor unit 14 may appropriately include an optical system (not illustrated) for irradiating the detecting light L1 in a desired direction. The LiDAR sensor unit 14 may include a scanning mechanism (not illustrated) for changing the irradiating direction of the detecting light L1 to scan a detection area.

The light receiving element 42 is configured to output a light receiving signal S1 corresponding to the amount of incident light. As the light receiving element 42, a photodiode, a phototransistor, a photo resistor, or the like can be used. The LiDAR sensor unit 14 may include an amplifier circuit (not illustrated) for amplifying the light receiving signal S1.

The left front ranging device 1 includes a processor 15. The processor 15 is disposed in the accommodation chamber 13. The processor 15 may be incorporated in the LiDAR sensor unit 14. The processor 15 outputs a control signal S0 for causing the light emitting element 41 to emit the detecting light L1 at a desired timing. The processor 15 receives the light receiving signal S1 outputted from the light receiving element 42.

The processor 15 includes an internal timer 15a for measuring time. The processor 15 calculates a distance to an object 200 that generated reflected light L2 based on a time period from the time when the detecting light L1 is emitted from the light emitting element 41 to the time when the reflected light L2 is incident on the light receiving element 42. The LiDAR sensor unit 14 can obtain information as to the shape of the object 200 associated with the reflected light L2 by accumulating the data as to the calculated distance in association with the irradiating direction of the detecting light L1.

In this exemplary configuration, the processor 15 is configured to calculate the distance after a lapse of a time period longer than a time period T1 from the time t0 when the detecting light L1 is emitted to the time when reflected light L3 reflected by an inner surface 12a of the translucent cover 12 is incident on the light receiving element 42.

More specifically, it is configured to perform the calculation of the distance after a lapse of a time period T2 from the time t0 to the time when reflected light L4 is incident on the light receiving element 42. The reflected light L4 is reflected by a virtual object 201 that situates at a position distant from the inner surface 12a of the translucent cover 12 toward the outside of the vehicle 100 by a distance d. The distance d is set as a value for which the ranging (detection) of an object that situates in an outside area of the vehicle 100 is meaningful. In other words, the distance d is set as a value capable of excluding the detection of an object that is too close to the translucent cover 12.

Figure 3B:
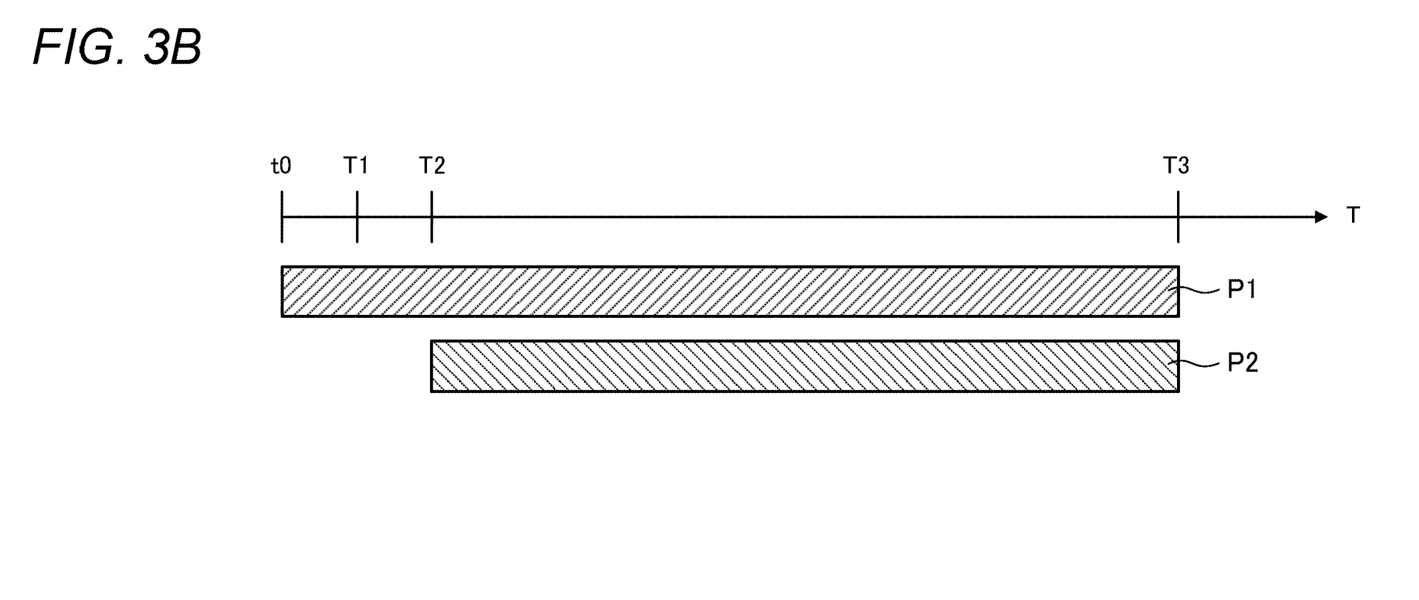
FIG. 3B illustrates an exemplary operation of the left front ranging device of FIG. 3A.
Figure 4:
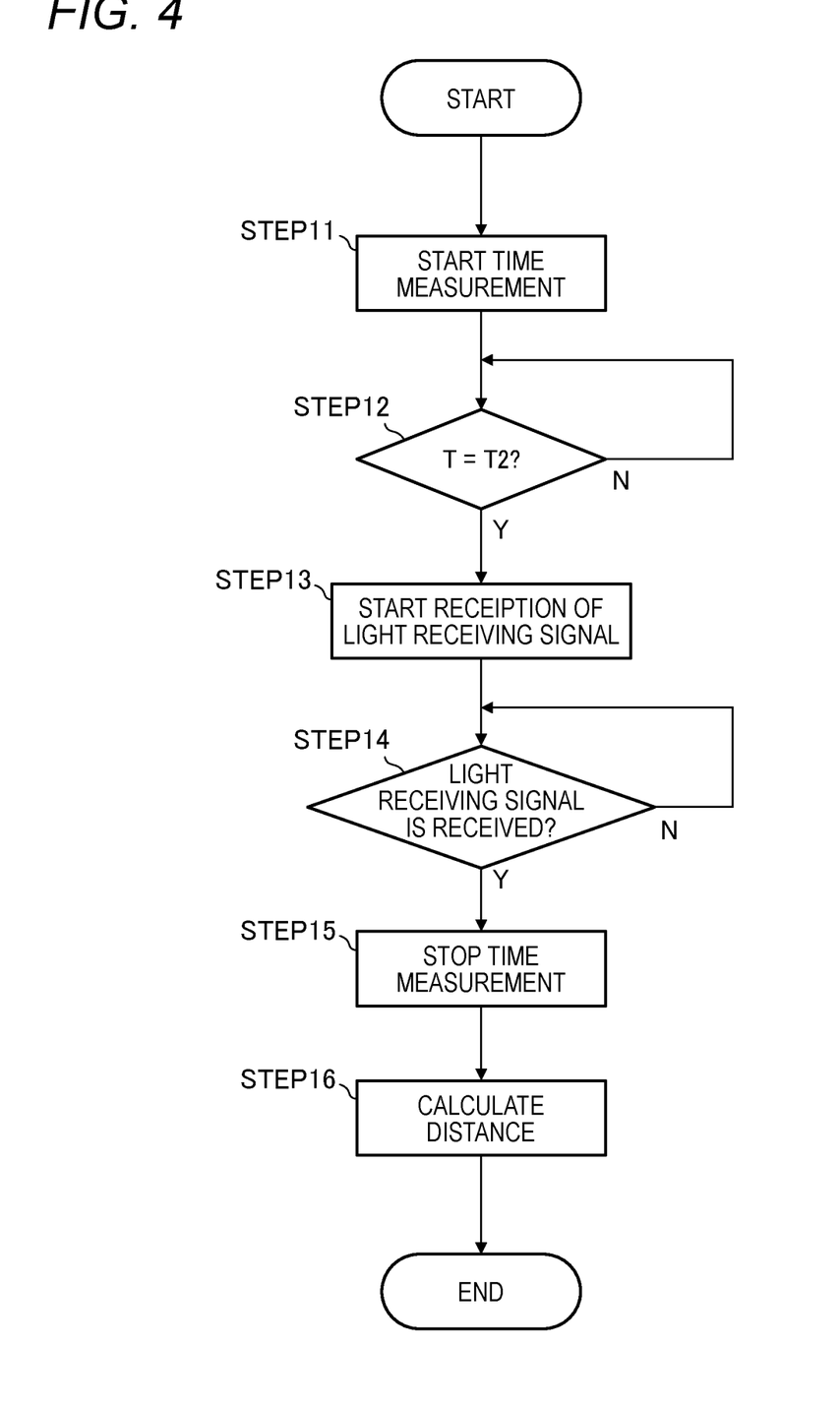
FIG. 4 illustrates an exemplary operation of the left front ranging device of FIG. 3A.

FIGS. 3B and 4 illustrate exemplary processing for realizing such an operation. First, the processor 15 starts time measurement from the time t0 when the light emitting element 41 emits the detecting light L1 (STEP11). The time measurement is performed by the internal timer 15a provided in the processor 15. For example, the time t0 may be set to a timing at which the processor 15 outputs the control signal S0 to the light emitting element 41.

The processor 15 determines whether a time period T measured by the internal timer 15a has reached T2 (STEP12). If the measured time period T has not reached T2 (N in STEP12), this determination processing is repeated.

When the measured time period reaches T2 (Y in STEP12), the processor 15 starts receiving the light receiving signal S1 outputted from the light receiving element 42 (STEP13). That is, after the elapse of the time period T2, the processor 15 can calculate the distance to the object associated with the light receiving signal S1 based on the time period from the time t0 to the time when the light receiving signal S1 is received. The time measurement with the internal timer 15a is continued.

The processor 15 determines whether the light receiving signal S1 is received (STEP14). If the light receiving signal S1 is not received (N in STEP14), this determination processing is repeated to continue the time measurement with the internal timer 15a.

When the light receiving signal S1 is received (Y in STEP14), the processor 15 stops the time measurement with the internal timer 15a (STEP15). In the case of the example illustrated in FIG. 3A and FIG. 3B, the light receiving signal S1 outputted by the incident of the reflected light L2 from the object 200 on the light receiving element 42 is received by the processor 15 after the elapse of the time period T3 from the time t0. The processor 15 calculates the distance to the object 200 based on the time period T3 (STEP16 in FIG. 4).

In FIG. 3B, a period P1 represents a period during which time measurement is performed by the internal timer 15a of the processor 15. The period P2 represents a period during which the processor 15 can receive the light receiving signal S1 from the light receiving element 42. In other words, even if the light receiving signal S1 is outputted by the incident of the reflected light on the light receiving element 42 before the time period T2 elapses, the processor 15 does not perform the calculation of the distance based on the light receiving signal S1.

In a case where the LiDAR sensor unit 14 is configured to be disposed in the accommodation chamber 13, the light emitting element 41 and the light receiving element 42 are covered by the translucent cover 12 forming a part of the outer surface of the vehicle 100. As a result, the detecting light L1 emitted from the light emitting element 41 may be partially reflected by the inner surface 12a of the translucent cover 12 and incident on the light receiving element 42 as the reflected light L3. When the light receiving signal S1 based on the reflected light L3 is outputted from the light receiving element 42, the processor 15 may recognize that an object is present at the position of the translucent cover 12.

According to the above exemplary configuration, the reception of the light receiving signal S1 by the processor 15 is started after the elapse of the time period T1 from the time t0 when the detecting light L1 is emitted to the time when the reflected light L3 is incident on the light receiving element 42, so that the distance to the object can be calculated. Therefore, it is possible to eliminate the influence of the internal reflection of the translucent cover 12 on the calculation of the distance to the object performed by the processor 15. Accordingly, the measurement accuracy of the left front ranging device 1 is enhanced.

More specifically, after the time period T2 elapses from the time t0 when the detecting light L1 is emitted to the time when the reflected light L4 reflected by the virtual object 201 that situates at a position distant from the inner surface 12a of the translucent cover 12 toward the outside of the vehicle 100 by the distance d is incident on the light receiving element 42, the reception of the light receiving signal S1 by the processor 15 (i.e., the calculation of the distance to the object) is started. Accordingly, it is possible to avoid a situation in which an object that situates outside the vehicle 100 but is too close to the translucent cover 12 obstructs meaningful ranging. Since the distance d can be relatively freely set regardless of the shape of the inner surface 12a of the translucent cover 12, in particular, in a case where the detecting light L1 passing through the translucent cover 12 is scanned, the processing load is suppressed.

Figure 5A:
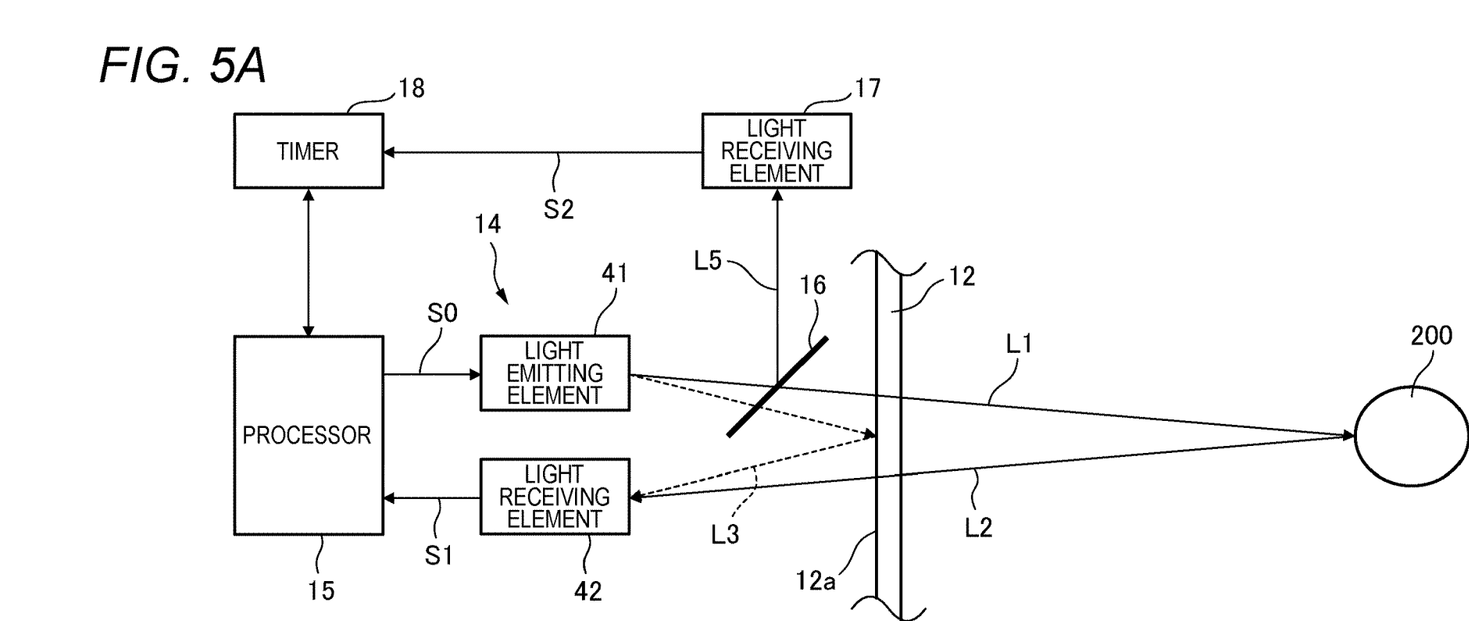
FIG. 5A illustrates a second exemplary configuration of the left front ranging device of FIG. 1.

FIG. 5A illustrates a second exemplary configuration of the left front ranging device 1. Components that are the same as or equivalent to those in the first exemplary configuration illustrated in FIG. 3A are assigned with the same reference symbols, and repetitive descriptions for those will be omitted.

The left front ranging device 1 according to the present example further includes a beam splitter 16, a light receiving element 17, and a timer 18.

The beam splitter 16 reflects a portion of the detecting light L1 emitted from the light emitting element 41 as reflected light L5 toward the light receiving element 17 while allowing passage of another portion of the detecting light L1. As long as a similar function can be realized, the beam splitter 16 can be replaced with at least one appropriate optical element.

The reflected light L5 from the beam splitter 16 is incident on the light receiving element 17. The light receiving element 17 is configured to output a light receiving signal S2 in response to the incident of the reflected light L5. As the light receiving element 17, a photodiode, a phototransistor, a photo resistor, or the like can be used. That is, it can be detected that the detecting light L1 is emitted from the light emitting element 41 based on the fact that the light receiving signal S2 is outputted from the light receiving element 17.

The timer 18 is configured to start time measurement when receiving the light receiving signal S2 outputted from the light receiving element 17. That is, the timer 18 is configured to start the time measurement based on the emission of the detecting light L1 from the light emitting element 41. The timer 18 is communicably connected to the processor 15.

In this exemplary configuration, the processor 15 is configured to calculate the distance after a lapse of a time period longer than a time period T1 from the time t0 when the detecting light L1 is emitted to the time when reflected light L3 reflected by an inner surface 12a of the translucent cover 12 is incident on the light receiving element 42.

Figure 5B:
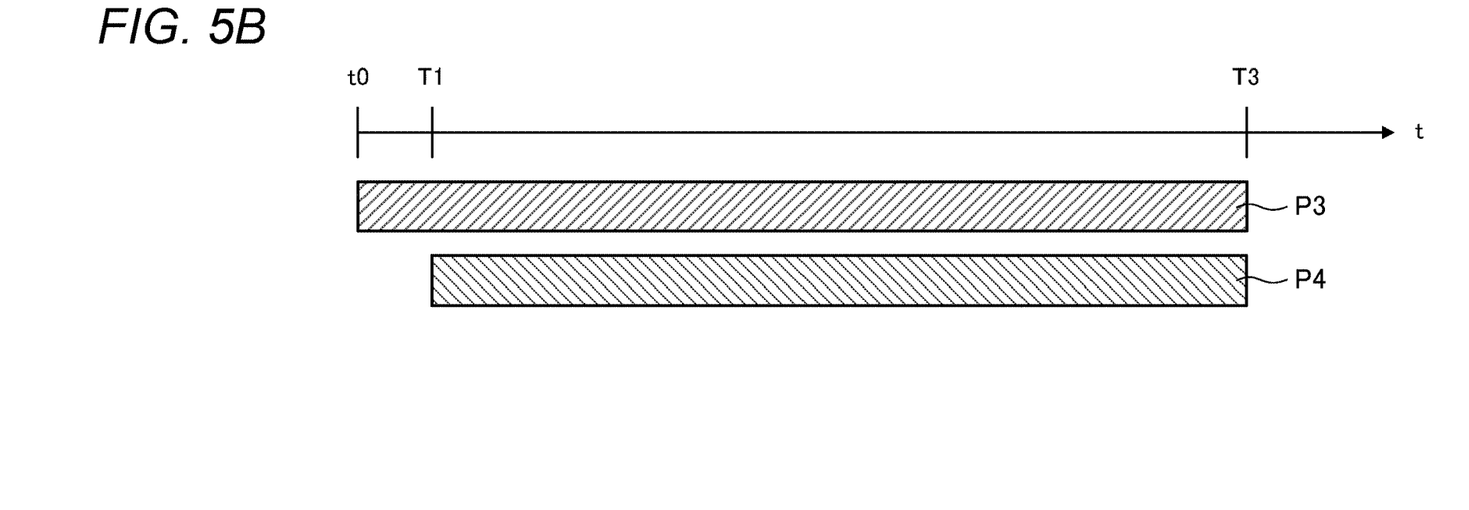
FIG. 5B illustrates how the left front ranging device of FIG. 5A operates.
Figure 6:
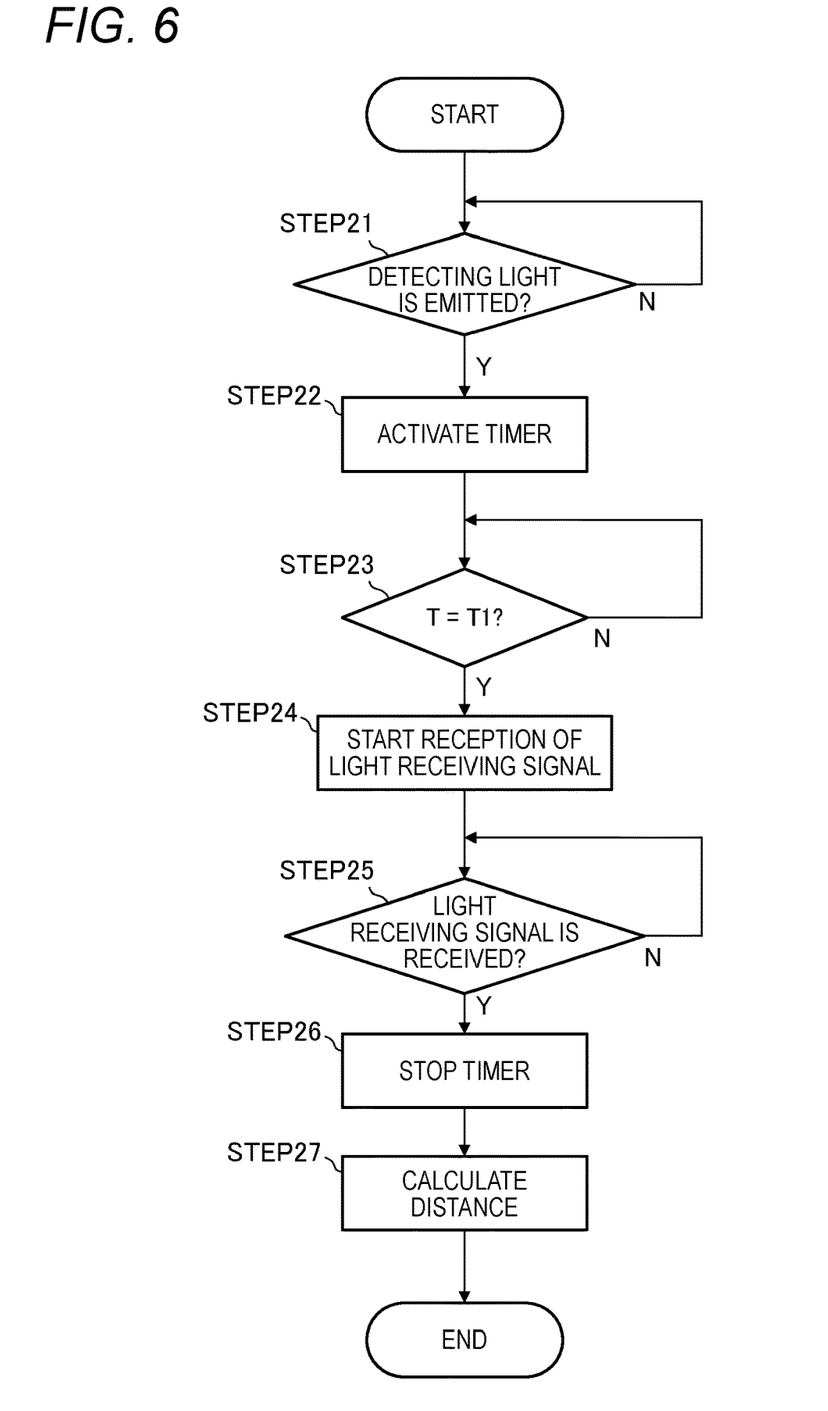
FIG. 6 illustrates how the left front ranging device of FIG. 5A operates.

FIGS. 5B and 6 illustrate exemplary processing for realizing such an operation. The timer 18 is in a standby state (N in STEP21) until the light receiving signal S2 is outputted from the light receiving element 17.

When the light receiving signal S2 is outputted from the light receiving element 17 in accordance with the emission of the detecting light L1 from the light emitting element 41 (Y in STEP21), the timer 18 is activated. That is, the timer 18 starts the time measurement substantially from the time t0 when the light emitting element 41 emits the detecting light L1 (STEP22).

The timer 18 determines whether the measured time period T has reached T1 (STEP23). If the measured time period T has not reached T1 (N in STEP23), this determination processing is repeated.

When the measured time period T reaches T1 (Y in STEP23), the timer 18 notifies the processor 15. In response to this notification, the processor 15 starts reception of the light receiving signal S1 outputted from the light receiving element 42 (STEP24). That is, after the elapse of the time period T1, the processor 15 can calculate the distance to the object associated with the light receiving signal S1 based on the time period from the time t0 to the time when the light receiving signal S1 is received. The time measurement with the timer 18 is continued.

The processor 15 determines whether the light receiving signal S1 is received (STEP25). If the light receiving signal S1 is not received (N in STEP25), this determination processing is repeated to continue the time measurement with the timer 18.

When the light receiving signal S1 is received (Y in STEP25), the processor 15 stops the time measurement with the timer 18 (STEP26). In the case of the example illustrated in FIG. 5A and FIG. 5B, the light receiving signal S1 outputted by the incident of the reflected light L2 from the object 200 on the light receiving element 42 is received by the processor 15 after the elapse of the time period T3 from the time t0. The processor 15 calculates the distance to the object 200 based on the time period T3 (STEP27 in FIG. 6).

In FIG. 5B, a period P3 represents a period during which the time measurement with the timer 18 is performed. The period P4 represents a period during which the processor 15 can receive the light receiving signal S1 from the light receiving element 42. In other words, even if the light receiving signal S1 is outputted by the incident of the reflected light on the light receiving element 42 before the time period T1 elapses, the processor 15 does not perform the calculation of the distance based on the light receiving signal S1.

According to the present exemplary configuration, the reception of the light receiving signal S1 by the processor 15 is started after the elapse of the time period T1 from the time t0 when the detecting light L1 is emitted to the time when the reflected light L3 is incident on the light receiving element 42, so that the distance to the object can be calculated. Therefore, it is possible to eliminate the influence of the internal reflection of the translucent cover 12 on the calculation of the distance to the object performed by the processor 15. Accordingly, the measurement accuracy of the left front ranging device 1 is enhanced.

In addition, since the timer 18 starts measuring the time period T1 based on the emission of the detecting light L1 from the light emitting element 41, it is possible to more accurately measure the time period T1. In a particular case where the detecting light L1 passing through the translucent cover 12 is scanned, the distance to the inner surface 12a of the translucent cover 12 may vary according to the light emitting direction of the detecting light L1. Even in such a case, it is possible to accurately set and measure the time period T1 that changes in accordance with the distance to the inner surface 12a.

The configuration using the beam splitter 16, the light receiving element 17, and the timer 18 illustrated in FIG. 5A is also applicable to the first exemplary configuration illustrated in FIG. 3A. That is, the measurement of the time period T2 with the internal timer 15a of the processor 15 may be performed by the timer 18 activated based on the emission of the detecting light L1 from the light emitting element 41.

Conversely, instead of measuring the time period T1 using the beam splitter 16, the light receiving element 17, and the timer 18 according to the present exemplary configuration, the time period T1 may be measured by the internal timer 15a of the processor 15.

Figure 7A:
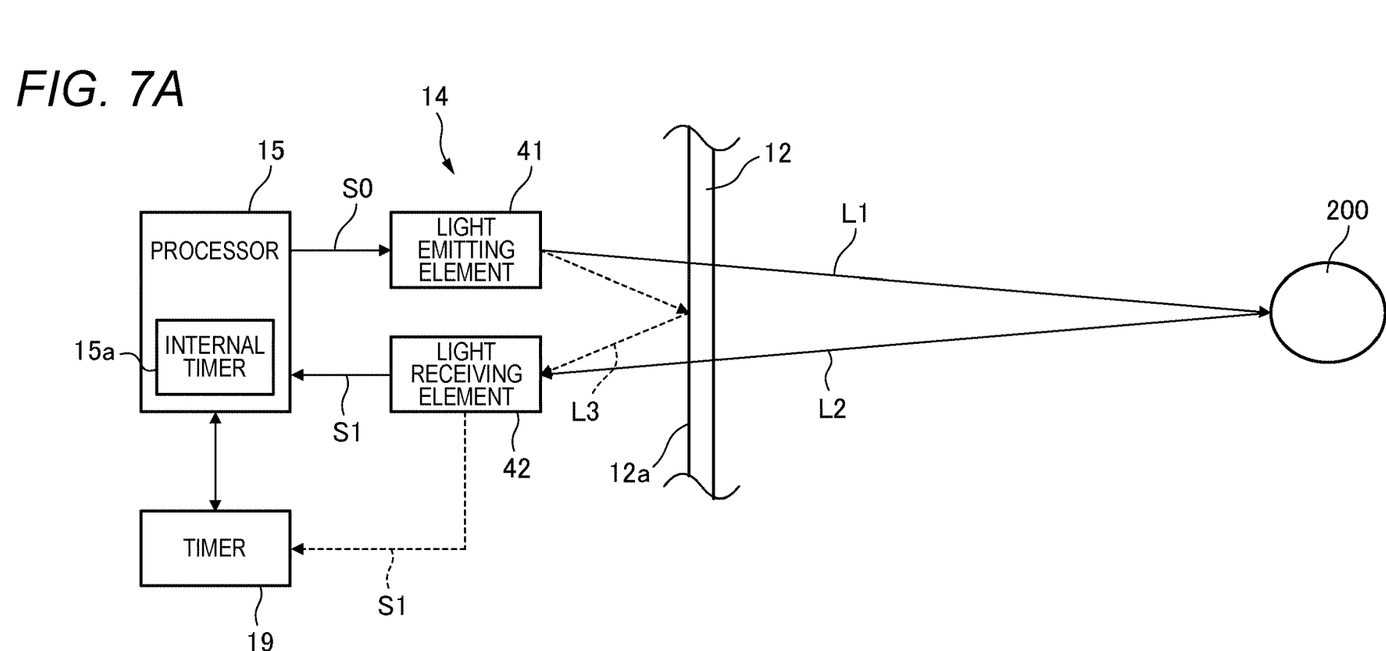
FIG. 7A illustrates a third exemplary configuration of the left front ranging device of FIG. 1.

FIG. 7A illustrates a third configuration of the left front ranging device 1. Components that are the same as or equivalent to those in the first exemplary configuration illustrated in FIG. 3A are assigned with the same reference symbols, and repetitive descriptions for those will be omitted.

The left front ranging device 1 according to the present example further includes a timer 19. The timer 19 is communicably connected to the processor 15.

In this exemplary configuration, the processor 15 is configured to calculate the distance after a lapse of a time period longer than a time period T1 from the time t0 when the detecting light L1 is emitted to the time when reflected light L3 reflected by an inner surface 12a of the translucent cover 12 is incident on the light receiving element 42.

Figure 7B:
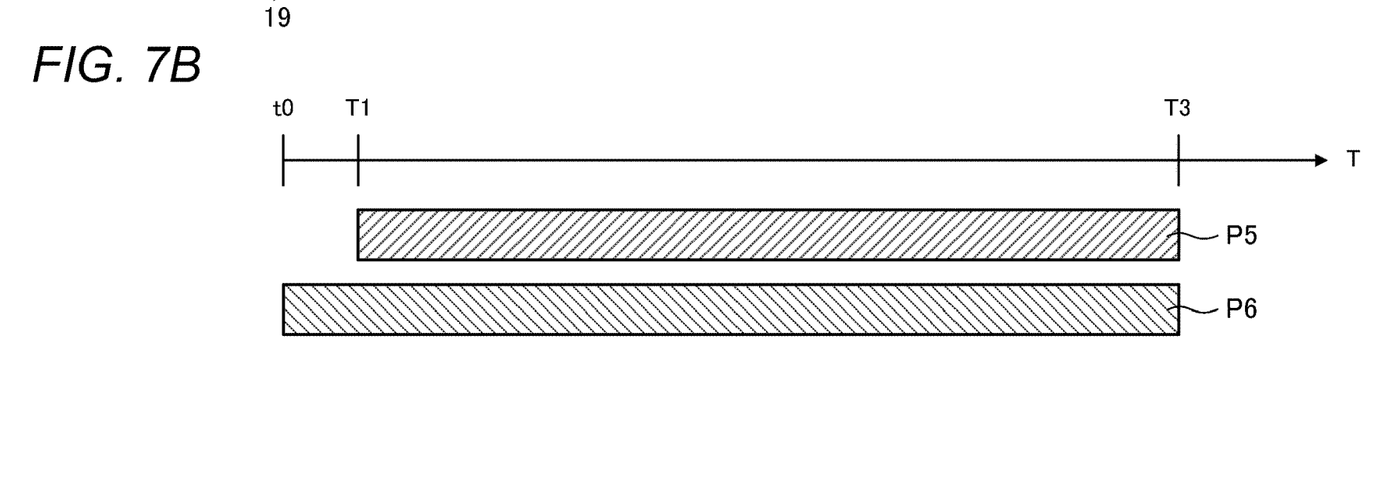
FIG. 7B illustrates how the left front ranging device of FIG. 7A operates.
Figure 8:
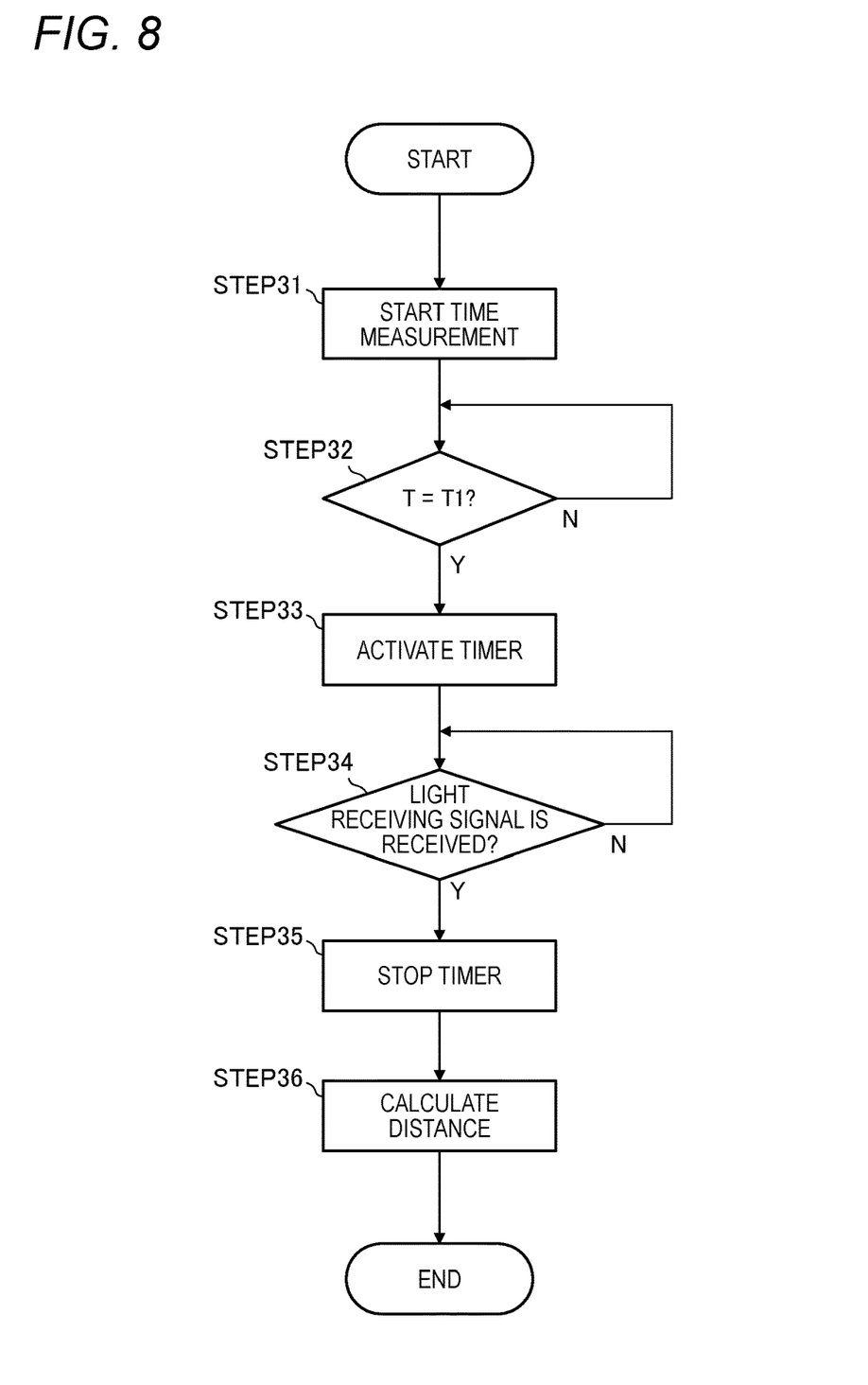
FIG. 8 illustrates how the left front ranging device of FIG. 7A operates.

FIGS. 7B and 8 illustrate exemplary processing for realizing such an operation. First, the processor 15 starts time measurement from the time t0 when the light emitting element 41 emits the detecting light L1 (STEP31). The time measurement is performed by the internal timer 15a provided in the processor 15. For example, the time t0 may be set to a timing at which the processor 15 outputs the control signal S0 to the light emitting element 41.

The processor 15 determines whether the time period T measured by the internal timer 15a has reached T1 (STEP32). If the measured time period T has not reached T1 (N in STEP32), this determination processing is repeated.

When the measured time period T reaches T1 (Y in STEP32), the processor 15 activates the timer 19 to start time measurement (STEP33).

The processor 15 determines whether the light receiving signal S1 is received (STEP34). If the light receiving signal S1 is not received (N in STEP34), this determination processing is repeated to continue the time measurement with the timer 19.

When the light receiving signal S1 is received (Y in STEP34), the processor 15 stops the time measurement with the timer 19 (STEP35). In the case of the example illustrated in FIG. 7A and FIG. 7B, the light receiving signal S1 outputted by the incident of the reflected light L2 from the object 200 on the light receiving element 42 is received by the processor 15 after the elapse of the time period T3 from the time to. The processor 15 calculates the distance to the object 200 based on the time measured by the timer 19 (STEP36 in FIG. 8).

In the above example, the time measured by the timer 19 is (T3−T1). For example, the processor 15 may obtain the value of the time period T3 by adding the time period T1 measured by the internal timer 15a to the time (T3−T1) measured by the timer 19, and calculate the distance to the object 200 corresponding to the value of the time period T3. Alternatively, since the time period T1 is known, the correspondence between the time value measured by the timer 19 and the distance value to the object can be stored in advance in a table or the like. In this case, the processor 15 may directly calculate the distance to the object 200 based on the correspondence with the time measured by the timer 19.

In FIG. 7B, a period P5 represents a period during which the time measurement with the timer 19 is performed. The period P6 represents a period during which the processor 15 can receive the light receiving signal S1 from the light receiving element 42. In other words, even if the light receiving signal S1 is outputted by the incident of the reflected light on the light receiving element 42 before the time period T1 elapses, the processor 15 cannot perform the calculation of the distance based on the light receiving signal S1. This is because the time measurement used for calculating the distance is not started by the timer 19.

According to the present exemplary configuration, the time measurement with the timer 19 is started after the elapse of the time period T1 from the time t0 when the detecting light L1 is emitted to the time when the reflected light L3 is incident on the light receiving element 42, so that the distance to the object can be calculated. Therefore, it is possible to eliminate the influence of the internal reflection of the translucent cover 12 on the calculation of the distance to the object performed by the processor 15. Accordingly, the measurement accuracy of the left front ranging device 1 is enhanced.

In addition, the processor 15 does not need to restrain the reception of the light receiving signal S1 from the light receiving element 42. Accordingly, it is possible to suppress an increase in the processing load of the processor 15.

As illustrated by dashed lines in FIG. 7A, the light receiving signal S1 outputted from the light receiving element 42 can also be inputted to the timer 19. In this case, the timer 19 may be configured to stop the time measurement in response to the reception of the light receiving signal S1, and to notify the processor 15 of the measured time. In this case, since it is possible to suppress the delay of the stop timing of the measurement due to involvement of the processor 15, the accuracy of the time period measured by the timer 19 is enhanced.

As illustrated in FIG. 1, the left front ranging device 1 may include a lamp unit 20. The lamp unit 20 is disposed in the accommodation chamber 13. The lamp unit 20 is a device for emitting visible light to the outside of the vehicle 100. Examples of the lamp unit 20 include a headlamp unit, a clearance lamp unit, a direction indicator lamp unit, and a fog lamp unit.

The lamp unit 20 is generally disposed at four corner portions of the vehicle 100. The four corner portions are also portions where there are few obstacles when detecting information in an outside area of the vehicle 100. By arranging the LiDAR sensor unit 14 so as to share the accommodation chamber 13 with the lamp unit 20, it is possible to efficiently detect the information in the outside area of the vehicle 100. On the other hand, the light emitted from the lamp unit 20 may be reflected by the inner surface 12a of the translucent cover 12. However, according to each of the above exemplary configurations, it is also possible to eliminate the influence of such internal reflection on the calculation of the distance to the object performed by the processor 15.

The functions of the processor 15 described above may be realized by a general-purpose microprocessor operating in cooperation with a memory, or may be realized by a dedicated integrated circuit such as a microcontroller, an FPGA, and an ASIC.

The above embodiments are mere examples for facilitating understanding of the presently disclosed subject matter. The configuration according to each of the above embodiments can be appropriately modified without departing from the gist of the presently disclosed subject matter.

Figure 2:
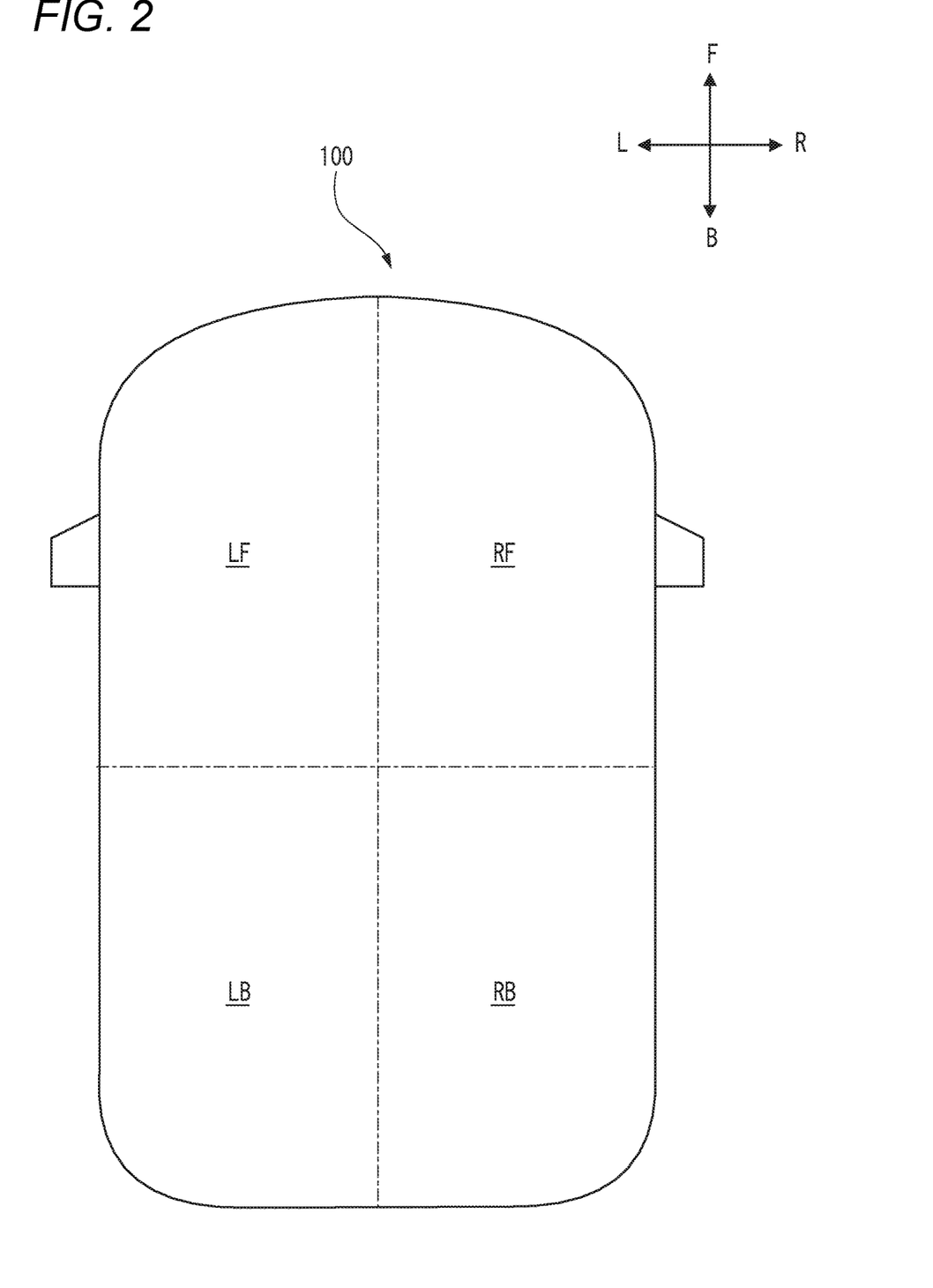
FIG. 2 illustrates a position of the left front ranging device of FIG. 1 in a vehicle.

A right front ranging device having a configuration symmetrical with the left front ranging device 1 illustrated in FIG. 1 relative to the left-right direction may be mounted on a right front portion RF of the vehicle 100 illustrated in FIG. 2. The right front portion RF is an area located on the right of the center in the left-right direction of the vehicle 100 and ahead of the center in the front-rear direction of the vehicle 100.

The configuration of the left front ranging device 1 is also applicable to a left rear ranging device. The left rear ranging device is mounted on a left rear portion LB of the vehicle 100 illustrated in FIG. 2. The left rear portion LB is an area located on the left of the center in the left-right direction of the vehicle 100 and behind the center in the front-rear direction of the vehicle 100. The basic configuration of the left rear ranging device may be symmetrical with the left front ranging device 1 relative to the front-rear direction.

The configuration of the left front ranging device 1 is also applicable to a right rear ranging device. The right rear ranging device is mounted on a right rear portion RB of the vehicle 100 illustrated in FIG. 2. The right rear portion RB is an area located on the right of the center in the left-right direction of the vehicle 100 and behind the center in the front-rear direction of the vehicle 100. The basic configuration of the right rear ranging device may be symmetrical with the left rear ranging device described above relative to the left-right direction.

The LiDAR sensor unit 14 may be replaced with an appropriate sensor unit that may be used for the ranging of an object 200 situates in an outside area of the vehicle 100. Examples of such a sensor unit include a TOF camera unit and a millimeter wave radar unit. A configuration using plural types of measurement techniques may be incorporated in a single sensor unit. The wavelength of the detecting light L1 emitted by the light emitting element 41 and the wavelength at which the light receiving element 42 has sensitivity can be appropriately determined according to the detection technique to be used.

The invention claimed is:

1. A ranging device adapted to be mounted on a vehicle, comprising:
   a light emitting element configured to emit detecting light;
   a light receiving element;
   a translucent cover configured to form a part of an outer surface of the vehicle and covering the light emitting element and the light receiving element;
   a first timer configured to start time measurement when the detecting light is emitted;
   a second timer; and
   a processor configured to cause the second timer to start time measurement when a time period measured by the first timer reaches a prescribed value, and to calculate a distance to an object that generated reflected light based on a time period to a time when the reflected light is incident on the light receiving element, that is measured by the second timer,
   wherein the prescribed value corresponds to at least a time period from a time when the detecting light is emitted to a time when reflected light generated by an inner surface of the translucent cover is incident on the light receiving element.

2. The ranging device according to claim 1, comprising:
   a lamp unit disposed in a space defined by the translucent cover, and configured to emit visible light toward the outside of the vehicle.

3. The ranging device according to claim 1,
   wherein the light emitting element and the light receiving element constitute a part of at least one of a LiDAR sensor unit, a TOF camera unit, and a millimeter wave radar unit.

4. The ranging device according to claim 1,
wherein the processor is configured not to calculate the distance based on the reflected light until the time period measured by the first timer reaches the prescribed value.

5. The ranging device according to claim 1,
wherein the light receiving element is configured to output a signal in response to incident of the reflected light;
wherein the second timer is configured to stop the time measurement in response to input of the signal; and
wherein the second timer is configured to notify the processor of the time period as measured.

* * * * *